(12) United States Patent
Gao et al.

(10) Patent No.: US 11,671,161 B2
(45) Date of Patent: *Jun. 6, 2023

(54) SYSTEM AND METHOD FOR ALLOCATING RESOURCES

(71) Applicant: ZTE CORPORATION, Guangdong (CN)

(72) Inventors: Bo Gao, Guangdong (CN); Yijian Chen, Guangdong (CN); Yu Ngok Li, Guangdong (CN); Zhaohua Lu, Guangdong (CN); Yifei Yuan, Guangdong (CN); Xinhui Wang, Guangdong (CN)

(73) Assignee: ZTE CORPORATION, Guangdong (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/503,131

(22) Filed: Oct. 15, 2021

(65) Prior Publication Data

US 2022/0109485 A1   Apr. 7, 2022

Related U.S. Application Data

(63) Continuation of application No. 16/670,580, filed on Oct. 31, 2019, now Pat. No. 11,159,224, which is a
(Continued)

(51) Int. Cl.
*H04B 7/06* (2006.01)
*H04L 1/00* (2006.01)
(Continued)

(52) U.S. Cl.
CPC .......... *H04B 7/0695* (2013.01); *H04L 1/0026* (2013.01); *H04L 5/005* (2013.01); *H04W 24/10* (2013.01); *H04W 56/001* (2013.01)

(58) Field of Classification Search
CPC ..... H04B 7/0695; H04L 1/0026; H04L 5/005; H04W 24/10; H04W 56/001
See application file for complete search history.

(56) References Cited

U.S. PATENT DOCUMENTS 9,198,070 B2   11/2015   Krishnamurthy et al.
10,333,680 B2   6/2019   Park et al.
(Continued)

FOREIGN PATENT DOCUMENTS

EP   2654333 A1   10/2013
JP   2014-143605 A   8/2014
(Continued)

OTHER PUBLICATIONS

NTT Docomo, Inc. "Discussion on CSI-RS configuration for NR RRM measurement in Connected mode" 3GPP TSG RAN WG1 Meeting #88bis, R1-1705713, Spokane, USA, Apr. 3-7, 2017, 7 pages.
(Continued)

*Primary Examiner* — Michael J Moore, Jr.
(74) *Attorney, Agent, or Firm* — Duane Morris LLP (57) ABSTRACT

A system and method for performing beam management is disclosed. In one embodiment, a method includes: determining a relationship between a first reference signal and a second reference signal, wherein the first and second reference signals share a same or similar one or more of the following properties: a channel property, a transmission property and a reception property; and transmitting the first and second reference signals to a wireless communication node.

17 Claims, 7 Drawing Sheets

Related U.S. Application Data continuation of application No. PCT/CN2017/083350, filed on May 5, 2017.

(51) Int. Cl.
*H04L 5/00* (2006.01)
*H04W 24/10* (2009.01)
*H04W 56/00* (2009.01)

(56) References Cited

U.S. PATENT DOCUMENTS

| | | | |
|---|---|---|---|
| 10,701,580 B2* | 6/2020 | Kim | H04W 72/046 |
| 10,834,716 B2* | 11/2020 | Park | H04L 5/0048 |
| 11,038,557 B2 | 6/2021 | Nam et al. | |
| 11,159,224 B2* | 10/2021 | Gao | H04L 5/005 |
| 2013/0301434 A1 | 11/2013 | Krishnamurthy et al. | |
| 2015/0146644 A1 | 5/2015 | Kim et al. | |
| 2015/0304868 A1 | 10/2015 | Yu | |
| 2015/0372851 A1 | 12/2015 | Kakishima | |
| 2017/0078062 A1 | 3/2017 | Park et al. | |
| 2018/0219606 A1* | 8/2018 | Ng | H04L 5/0048 |
| 2018/0227031 A1* | 8/2018 | Guo | H04B 7/0626 |
| 2018/0262313 A1* | 9/2018 | Nam | H04L 5/0044 |
| 2018/0279152 A1* | 9/2018 | Kim | H04W 24/10 |
| 2018/0288755 A1* | 10/2018 | Liu | H04W 72/0446 |
| 2019/0074880 A1* | 3/2019 | Frenne | H04B 7/0634 |
| 2019/0200249 A1* | 6/2019 | Yoon | H04W 24/08 |
| 2019/0261329 A1* | 8/2019 | Park | H04L 5/0048 |
| 2019/0356438 A1* | 11/2019 | Lee | H04B 7/0408 |
| 2019/0356524 A1* | 11/2019 | Yi | H04L 27/26025 |
| 2019/0379431 A1* | 12/2019 | Park | H04B 7/0408 |
| 2020/0022010 A1* | 1/2020 | Kim | H04W 16/14 |
| 2020/0059290 A1* | 2/2020 | Pan | H04B 7/0874 |
| 2020/0112355 A1* | 4/2020 | Park | H04B 7/0626 |
| 2020/0127726 A1* | 4/2020 | Gao | H04W 24/10 |
| 2020/0196161 A1* | 6/2020 | Ahn | H04W 56/001 |
| 2020/0389220 A1* | 12/2020 | Kang | H04W 74/0833 |

FOREIGN PATENT DOCUMENTS

| | | |
|---|---|---|
| WO | 2014165712 A1 | 10/2014 |
| WO | 2015115376 A1 | 8/2015 |
| WO | 2015169391 A1 | 11/2015 |

OTHER PUBLICATIONS

Huawei, et al., "Details of QCL assumptions and related RS design considerations", 3GPP TSG RAN WG1 Meeting #88bis, R1-1704239, Apr. 7, 2017, 5 pages.

LG Electronics, "Discussion on QCL for NR", 3GPP TSG RAN WG1 Meeting #88bis, R1-1704893, Apr. 7, 2017, 2 pages.

LG Electronics, "Discussion on QCL for NR", 3GPP TSG RAN WG1 Meeting #88, R1-1702466, Feb. 13-17, 2017, Athens, Greece , 3 pages.

Huawei, "Details of QCL assumptions and related RS design considerations", 3GPP TSG RAN WG1 Meeting #88, R1-1701697, Feb. 13-17, 2017, Athens, Greece, 5 pages.

Catt, "Further discussion on QCL for DL", 3GPP TSG RAN WG1 #88, R1-1702075, Feb. 13-17, 2017, Athens, Greece, 3 pages.

Intel Corporation, "Cross-carrier QCL for NR", 3GPP TSG RAN WG1 Meeting #88, R1-1702215, Feb. 13-17, 2017, Athens, Greece, 2 pages.

ZTE, "QCL/QCB design for DL MIMO", 3GPP TSG RAN WG1 Meeting #88bis, R1-1704415, Apr. 3-7, 2017, Spokane, USA.

Huawei, "Discussion on new QCL assumption for DMRS antenna ports", 3GPP TSG RAN WG1 Meeting #88bis, R1-1705117, Apr. 3-7, 2017, Spokane, USA.

Catt, Discussion on QCL for NR, 3GPP TSG RAN WG1 Meeting #88bis, R1-1704567, Apr. 3-7, 2017, Spokane, USA.

\* cited by examiner

SYSTEM AND METHOD FOR ALLOCATING RESOURCES

CROSS-REFERENCE TO RELATED APPLICATIONS

The present application is a continuation application of U.S. application Ser. No. 16/670,580, entitled "SYSTEM AND METHOD FOR ALLOCATING RESOURCES," filed on Oct. 31, 2019, which is a continuation application of PCT international application PCT/CN2017/083350, entitled "SYSTEM AND METHOD FOR ALLOCATING RESOURCES," filed on May 5, 2017, each of which is incorporated by reference herein in its entirety.

TECHNICAL FIELD

This disclosure relates generally to wireless communications and, more particularly, to systems and methods for performing beam management.

BACKGROUND

In current architectures for beam reporting, only channel state information—reference signals (CSI-RS's) are used for beam management functions such as beam sweeping, beam determination and beam reporting (e.g., reporting beam ID and layer 1 (L1) reference signal received power (RSRP), etc.). When searching for new beams to establish a new communication link when a radio channel is blocked, e.g., by a human, building or other obstacle, the drawback of using CSI-RS's (i.e., limited spatial coverage) for beam management is increased. More specifically, UE-specific CSI-RS's are limited to the narrow spatial coverage provided by their respective beams. For instance, if a base station (BS) such as a next generation nodeB (gNodeB or gNB) has a multiple-in-multiple-out (MIMO) antenna array that includes 1024 antenna elements, the number of narrow beams for transmission can be up to 4096 beams. In order to identify which of these beams are suitable or "best" for communications with a respective UE, aperiodic sub-band channel quality indicator (CQI) measurements may be sent by a UE via the Physical Uplink Shared Channel (PUSCH). However, such CQI measurements must be transmitted when an RF beam from a respective transmission point (TRP) is focused on a sub-area that contains the current UE location.

Performing such beam management functions can cause undue delays and result in system utilization inefficiencies. For example, delays of up to tens of milliseconds at a 60 KHz subcarrier spacing may be caused, which is unacceptable for many applications in a real network. Additionally, as mentioned above, when using CSI-RS's alone, once the radio link is blocked or a beam link failure occurs, it is difficult to identify new beams given the narrow beam widths associated with CSI-RS signals transmitted by a base station. Thus, bottlenecks due to limited spatial coverage are observed by current beam management techniques that utilize only CST-RS's. Therefore, there is a need for improved methods of performing beam management functions.

SUMMARY OF THE INVENTION

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the invention. In one embodiment, a method includes: storing a relationship between a first reference signal and a second reference signal, wherein the first reference signal is a first reference signal type and the second reference signal is a second reference signal type different from the first reference signal type, and wherein the first and second reference signals share a same or similar one or more of the following properties: a channel property, a transmission property and a reception property; and transmitting the first and second reference signals to a wireless communication node.

In a further embodiment, a method includes: receiving a first reference signal of a first type transmitted using a first resource; receiving a second reference signal of a second type different from the first type transmitted using a second resource, wherein the first and second reference signals share a same or similar one or more of the following properties: a channel property, a transmission property and a reception property; measuring a first signal quality parameter associated with the first reference signal; generating a beam report based on at least the measured first signal quality parameter; and transmitting the beam report to a communication node.

In another embodiment, a communication node includes: a memory for storing a relationship between a first reference signal and a second reference signal, wherein the first reference signal is a first reference signal type and the second reference signal is a second reference signal type different from the first reference signal type, and wherein the first and second reference signals share a same or similar one or more of the following properties: a channel property, a transmission property and a reception property; and a transmitter configured to transmit the first and second reference signals to a wireless communication node.

In yet another embodiment, a communication node, includes: a receiver configured to: receive a first reference signal of a first type transmitted using a first resource; receive a second reference signal of a second type different from the first type transmitted using a second resource, wherein the first and second reference signals share a same or similar one or more of the following properties: a channel property, a transmission property and a reception property; at least one processor configured to: determine a first signal quality parameter associated with the first reference signal; generate a beam report based on at least the measured first signal quality parameter; and a transmitter configured to transmit the beam report to a second communication node.

BRIEF DESCRIPTION OF THE DRAWINGS

Various exemplary embodiments of the invention are described in detail below with reference to the following Figures. The drawings are provided for purposes of illustration only and merely depict exemplary embodiments of the invention to facilitate the reader's understanding of the invention. Therefore, the drawings should not be considered limiting of the breadth, scope, or applicability of the invention. It should be noted that for clarity and ease of illustration these drawings are not necessarily drawn to scale.

DETAILED DESCRIPTION OF EXEMPLARY EMBODIMENTS

Various exemplary embodiments of the invention are described below with reference to the accompanying figures to enable a person of ordinary skill in the art to make and use the invention. As would be apparent to those of ordinary skill in the art, after reading the present disclosure, various changes or modifications to the examples described herein can be made without departing from the scope of the invention. Thus, the present invention is not limited to the exemplary embodiments and applications described and illustrated herein. Additionally, the specific order or hierarchy of steps in the methods disclosed herein are merely exemplary approaches. Based upon design preferences, the specific order or hierarchy of steps of the disclosed methods or processes can be re-arranged while remaining within the scope of the present invention. Thus, those of ordinary skill in the art will understand that the methods and techniques disclosed herein present various steps or acts in a sample order, and the invention is not limited to the specific order or hierarchy presented unless expressly stated otherwise.

Figure 1:
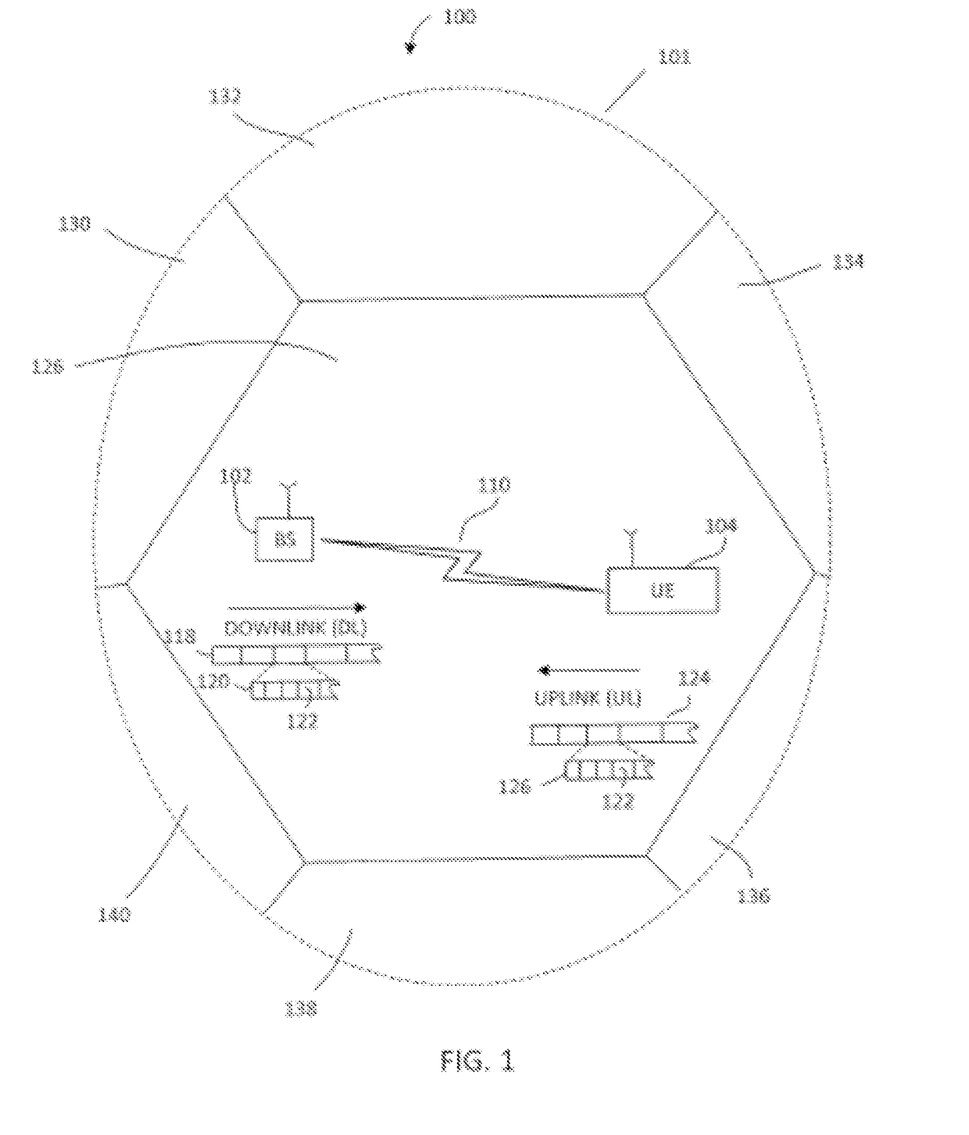
FIG. 1 illustrates an exemplary cellular communication network 100 in which techniques disclosed herein may be implemented, in accordance with various embodiments of the present disclosure.

FIG. 1 illustrates an exemplary wireless communication network 100 in which techniques disclosed herein may be implemented, in accordance with an embodiment of the present disclosure. The exemplary communication network 100 includes a base station (BS) 102 and a user equipment (UE) device 104 that can communicate with each other via a communication link 110 (e.g., a wireless communication channel), and a cluster of notional cells 126, 130, 132, 134, 136, 138 and 140 overlaying a geographical area 101. In FIG. 1, the BS 102 and UE 104 are contained within the geographic boundary of cell 126. Each of the other cells 130, 132, 134, 136, 138 and 140 may include at least one base station operating at its allocated bandwidth to provide adequate radio coverage to its intended users. For example, the base station 102 may operate at an allocated channel transmission bandwidth to provide adequate coverage to the UE 104. The base station 102 and the UE 104 may communicate via a downlink radio frame 118, and an uplink radio frame 124 respectively. Each radio frame 118/124 may be further divided into sub-frames 120/126 which may include data symbols 122/128. In the present disclosure, the base station (BS) 102 and user equipment (UE) 104 are described herein as non-limiting examples of "communication nodes," generally, which can practice the methods disclosed herein. Such communication nodes may be capable of wireless and/or wired communications, in accordance with various embodiments of the invention.

In network 100, a signal transmitted from the base station 102 may suffer from the environmental and/or operating conditions that cause undesirable channel characteristic, such as Doppler spread, Doppler shift, delay spread, multipath interference, etc. mentioned above. For example, multipath signal components may occur as a consequence of reflections, scattering, and diffraction of the transmitted signal by natural and/or man-made objects. At the receiver antenna 114, a multitude of signals may arrive from many different directions with different delays, attenuations, and phases. Generally, the time difference between the arrival moment of a first received multipath component (typically the line of sight (LOS) component) and the last received multipath component (typically a non-line of sigh (NLOS) component) is called delay spread. The combination of signals with various delays, attenuations, and phases may create distortions such as inter-symbol interference (ISI) and inter-channel interference (ICI) in the received signal. The distortion may complicate reception and conversion of the received signal into useful information. For example, delay spread may cause ISI in the useful information (data symbols) contained in the radio frame 124.

Figure 2:
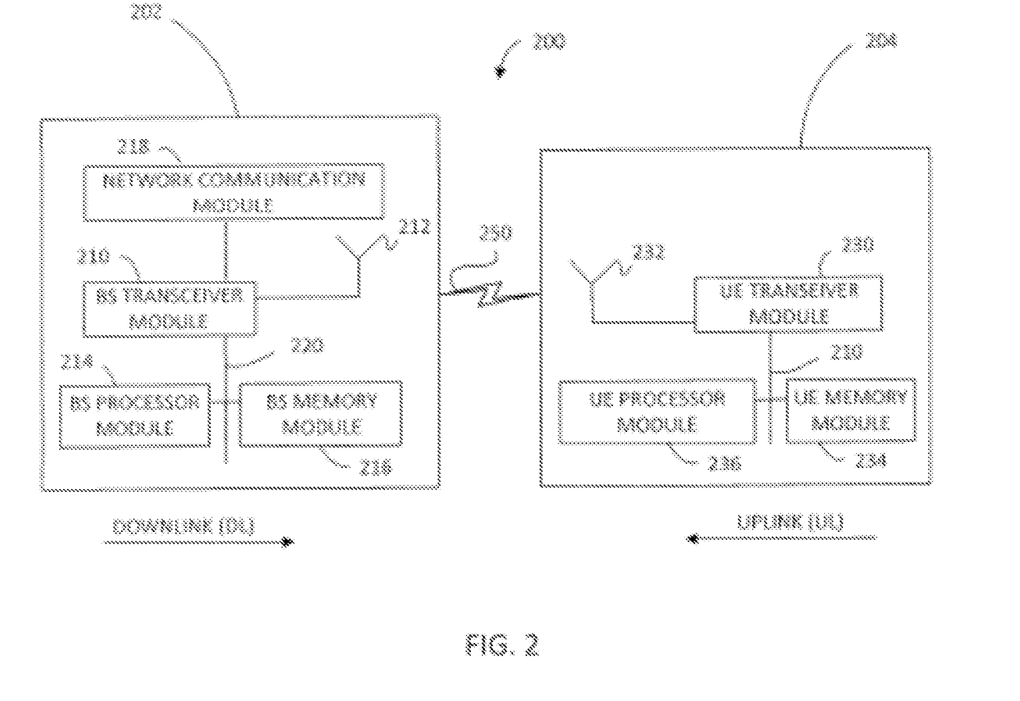
FIG. 2 illustrates block diagrams of an exemplary base station and user equipment device, in accordance with some embodiments of the invention.

FIG. 2 illustrates block diagrams of an exemplary system 200 including a base station 202 and UE 204 for transmitting and receiving wireless communication signals, e.g., OFDM/OFDMA signals, between each other. The system 200 may include components and elements configured to support known or conventional operating features that need not be described in detail herein. In one exemplary embodiment, system 200 can be used to transmit and receive data symbols in a wireless communication environment such as the wireless communication environment 100 of FIG. 1, as described above.

The base station 202 includes a BS transceiver module 210, a BS antenna 212, a BS processor module 214, a BS memory module 216, and a network communication module 218, each module being coupled and interconnected with one another as necessary via a date communication bus 220. The UE 204 includes a UE transceiver module 230, a UE antenna 232, a UE memory module 234, and a UE processor module 236, each module being coupled and interconnected with one another as necessary via a date communication bus 240. The BS 202 communicates with the UE 204 via a communication channel 250, which can be any wireless channel or other medium known in the art suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as limiting the scope of the present invention.

In accordance with some embodiments, UE transceiver 230 may be referred to herein as an "uplink" transceiver 230 that includes a RF transmitter and receiver circuitry that are each coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes RF transmitter and receiver circuitry that are each coupled to the antenna 212. A downlink duplex switch may alternatively couple the downlink transmitter or receiver to the downlink antenna 212 in time duplex fashion. The operations of the two transceivers 210 and 230 are coordinated in time such that the uplink receiver is coupled to the uplink antenna 232 for reception of transmissions over the wireless transmission link 250 at the same time that the downlink transmitter is coupled to the downlink antenna 212. Preferably there is close time synchronization with only a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some exemplary embodiments, the UE transceiver 608 and the base station transceiver 602 are configured to support industry standards such as the Long Term Evolution (LTE) and emerging 5G standards, and the like. It is understood, however, that the invention is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively. The network communication module 218 generally represents the hardware, software, firmware, processing logic, and/or other components of the base station 202 that enable bi-directional communication between base station transceiver 602 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)).

In order to meet the performance requirements of International Mobile Telecommunications (IMT)-Advanced systems, the LTE/LTE-Advanced standards have offered several features to optimize radio networks in the frequency, time and/or spatial domains. With the continuing evolutions of wireless technologies, it is expected that future radio access networks will be able to support the explosive growth of wireless traffic. Among these features, widening the system bandwidth is one straightforward way to improve the link and system capacity, which is already being tested and confirmed by the deployment of carrier aggregation in LTE-Advanced systems.

As the demand for capacity increases, mobile industries as well as academia have become more interested in increasing system bandwidths to greater than 100 MHz. Additionally, because spectrum resources operating below a frequency of 6 GHz have become more congested, high-frequency communications above 6 GHz are well-suited to support system bandwidths of more than 100 MHz, or even up to 1 GHz.

In some embodiments, communications between a base station and a UE are implemented with signal frequencies greater than 6 GHz, which are also called "millimeter wave communications." When using wide or ultra wide spectrum resources, however, a considerable propagation loss can be induced by high operating frequencies (i.e., greater than 6 GHz). To solve this, antenna array and beamforming (BF) training technologies using Massive MIMO, e.g., 1024 antenna elements for one node, have been adopted to achieve beam alignment and obtain sufficiently high antenna gain. To keep implementation costs down while benefiting from antenna array technologies, analog phase shifters have become attractive for implementing mm wave beam forming (BF), which means that the number of phases is finite and other constraints (e.g., amplitude constraints) can be placed on the antenna elements to provide variable-phase-shift based BF. Given such pre-specified beam patterns, e.g., the antenna weight vector (AWV) codebook, the variable-phase-shift-based BF training targets to identify the best-N beams, for subsequent data transmission can be determined.

In order to perform beam management in MIMO systems, the BS 102 may transmit a plurality of beams each containing a CSI-RS for one or more UEs (e.g., UE 104) within the coverage range of the BS 102. Upon receiving a particular beam containing the CSI-RS, the UE 104 may perform channel estimation based on the received CSI-RS. Thereafter, the UE 104 may transmit to the BS 102 a channel state information (CSI) signal associated with the beam selected by the UE 104. The UE 104 may perform beamforming based on the CSI of the selected beam which contains the CSI-RS. Thereafter, the BS 102 may transmit user data for the UE by precoding the user data based on the received CSI. As explained above, although the beamformed CSI-RS has antenna gain, narrow beam widths of the CSI-RS could mean that the UE 104 may not receive the CSI-RS signal. For the example, if the UE is in between a first beam and a second beam, the UE 104 may not receive the CSI-RS. Since the current LTE-A communication system has a limited number (e.g., 8) antenna ports for CSI-RS, the antenna ports do not normally provide sufficient coverage in the vertical dimension. This means that only some UE's within a cell coverage may receive a CSI-RS successfully, while other UE's may not receive one of these narrow beams. Therefore, an improved beam management method is desirable.

In various embodiments of the invention, in addition to provided CSI-RS signals for beam management, one or more second types of reference signals (RS's) are utilized to provide broader beam coverage. In some embodiments, the second type of RS is provided by a synchonization signal (SS) block, which includes at least a primary synchronization signal (PSS), a secondary synchronization signal (SSS), and a physical broadcast channel (PBCH). In some embodiments, the demodulation reference signal (DMRS) associated with the PBCH can be used for beam management purposes. As used herein, "SS block" refers to any one or more of the PSS, SSS or DMRS of the PBCH; which can share the same transmission (Tx) beam. Both the CSI-RS and SS-block signals are beamformed signals with a specified radio-propagation direction. The SS block can be considered as a cell-specific configured RS, while the CSI-RS can be considered as a UE-specific configured RS. The former can cover a wide area within a cell and serve all UEs within the wide area, however, it's spatial resolution is low (i.e., it is transmitted as a wide beam). On the other hand, the CSI-RS provides higher spatial resolution (i.e., a narrow beam) and a stronger signal within the narrow beam, but covers only a narrow area. Thus, the combination of both CSI-RS and SS block signals can provide both wide area coverage and high spatial resolution to enable faster, more efficient identification of new beams when a current channel is blocked, weak and/or distorted.

Grouping/Associating Different RS's

Figure 3:
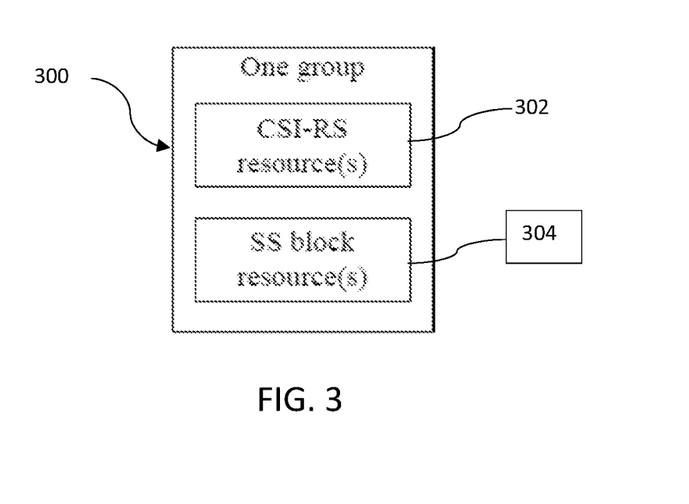
FIG. 3 illustrates a conceptual block diagram of grouping or associating two or more different types of RS resources into a single resource group, in accordance with some embodiments.

FIG. 3 illustrates a conceptual block diagram of grouping or associating two or more different types of RS resources (e.g., a CSI-RS resource and a SS block resource) into a single resource group that may be allocated to one or more UE's. In accordance with various embodiments, a resource group 300 may be created by grouping a CSI-RS resource and a SS resource when the CSI-RS and the SS block resources share the same or similar channel properties. As used herein, the term "resource" refers to any network or protocol resource (e.g., a resource block, a resource element, slot, subframe, sub-carrier, etc.) that may be allocated to one or more UE's for transmitting signals thereto. When two or more types of resources share the same or similar channel properties and are grouped together, such resources are said to be "quasi-co-located (QCLed)" herein. Such grouping may be performed by a communication node such as a BS and/or a UE, as described herein.

In accordance with various embodiments, channel properties for determining whether two or more resources should be QCLed can include one or more of the following properties: (1) Doppler spread; (2) Doppler shift; (3) delay spread; (4) average delay; (5) average gain; and (6) Spatial parameter. As used herein, "Doppler spread" refers to the frequency-domain spread for one received multipath component, "Doppler shift" refers to the frequency difference between one carrier component observed by a receiver and that transmitted by a transmitter in terms of carrier frequency, "delay spread" refers to the time difference between the arrival moment of a first received multipath component (typically the line of sight (LOS) component) and the last received multipath component (typically a non-line of sigh (NLOS) component), "average delay" refers to weighed average of delay of all multipath components multiplied by a power of each components, "average gain" refers to an average transmission power per antenna port or resource element, and "Spatial parameter" refers to spatial-domain properties of multipath components observed by a receiver, such as angle of arrival (AoA), spatial correlation, etc. This information of channel properties can be pre-defined or configured by L−1 or higher level signaling. For example, it can be predefined that two channel properties are similar to each other when their respective parameter values are within 5% or 10% of each other.

In one embodiment, for example, a CSI-RS resource is QCLed with a SS block resource if their respective channels share the same or similar Doppler shift properties. In this instance, the SS block signals (i.e., PSS and/or SSS) can be used as a reference signal for synchronizing the CSI-RS signal when the CSI-RS and SS block signals are transmitted from different TRPs (e.g., different antenna ports or elements) of the BS, e.g., in a multiple TRP scenario similar to a LTE coordinated multipoint (CoMP) scenario. In such a scenario, since the BS is aware of the timing parameters of all its antenna ports, all of its antenna ports and elements can be synchronized or coordinated with one another. Therefore, the SS block signal received by a UE can enable the UE to synchronize with the corresponding QCLed CST-RS and thereafter utilize the channel (beam) corresponding to the CSI-RS for further communications with the BS.

In one embodiment, a CSI-RS resource is QCLed with a SS block resource if their respective channels share the same or similar Doppler shift and Spatial parameter properties. In this instance, the SS block signals (i.e., PSS and/or SSS) can be used as a reference signal for synchronizing the CSI-RS signal when the CSI-RS and SS block signals are transmitted from different TRPs of the BS.

In a further embodiment, a CSI-RS resource is QCLed with a SS block resource if their respective channels share the same or similar Doppler shift and average delay properties. In this instance, the SS block signals (i.e., PSS and/or SSS) can be used as a reference signal for synchronizing the CSI-RS signal when the CSI-RS and SS block signals are transmitted from the same TRP of the BS.

In a further embodiment, a CSI-RS resource is QCLed with a SS block resource if their respective channels share the same or similar Doppler shift, average delay and Spatial parameter properties. In this instance, the SS block signals (i.e., PSS and/or SSS) can be used as a reference signal for synchronizing the CSI-RS signal when the CSI-RS and SS block signals are transmitted from the same TRP of the BS.

In a further embodiment, a CSI-RS resource is QCLed with a SS block resource if their respective channels share the same or similar Doppler shift and average delay properties. In this instance, the SS block signals (i.e., PSS and/or SSS) can be used as a reference signal for synchronizing the CSI-RS signal when the CSI-RS and SS block signals are transmitted from the same TRP of the BS.

In another embodiment, a CSI-RS resource is QCLed with a SS block resource if their respective channels share the same or similar Doppler spread, Doppler shift, delay spread and average delay properties. In this instance, the SS block can be used as a reference signal for the CSI-RS for frequency and time tracking. In various communication nodes that are capable of wireless network communications, the central frequency and phase of an oscillator can be time variant. Additionally, a UE's movement can also have some affects on the carrier's frequency and time phase from the UE's perspective. Therefore, the SS block having the same or a nearby port in the neighborhood of the CSI-RS port can be used for highly accurate time and frequency error estimation.

In yet another embodiment, a CSI-RS resource is QCLed with a SS block resource if their respective channels share the same or similar Doppler spread, Doppler shift, delay spread, average delay and Spatial parameter properties. In this instance, the SS block can be used as a reference signal for the CSI-RS for frequency and time tracking when a similar transmission (Tx) beam is transmitted for both the SS block and CSI-RS signals.

In another embodiment, one or more CSI-RS resources can be grouped by the UE based on whether or not they have similar channel properties as one SS block. In some embodiments, the SS block serves as reference signaling for the CSI-RS grouping. In such scenarios, the SS block identification (ID) value can be used as a group ID.

In some embodiments, a CSI-RS resource and a SS block resource can be grouped into a resource group allocated to one or more UE's if the resources share the same or similar transmission properties per a TRP basis (for transmission/ resource setting). In some embodiments, the transmission properties include: (1) whether the resources use the same TRP antenna group, e.g., Tx panel; (2) whether the resources are from the same physical location (e.g., same BS or same TRP); (3) whether the resources can be transmitted simultaneously with each other; and (4) whether the resources cannot be transmitted simultaneously with each other. In such embodiments, when two or more types of resources share the same or similar transmission properties and are grouped together, such resources are said to be "quasi-co-located (QCLed)" herein.

In some embodiments, a CSI-RS resource and a SS block resource can be grouped into a resource group if they share the same or similar reception properties per UE basis (used for UE reporting). In some embodiments, these reception properties include: (1) whether the resources can be received by the same UE antenna group; (2) whether the resources are received by certain UE receive modes and/or beams; (3) whether the resources can be received simultaneously; and (4) whether the resources cannot be received simultaneously. In these embodiments, when two or more types of resources share the same or similar reception properties and are grouped together, such resources are said to be "quasi-co-located (QCLed)" herein.

QCL Inheriting Across Different RS Groups

In some embodiments, if two CSI-RS groups are QCLed with two different SS blocks, respectively, by a BS, and the UE groups the two different SS blocks through reporting, this implies that two CSI-RS groups share the same channel, transmission and/or receive properties as the SS blocks they are QCLed with. In other embodiments, if the BS configures two SS blocks as being QCLed with each other, and then the BS configures a first CSI-RS-A as QCLed with one of the SS blocks, and configures a second CSI-RS-B as QCLed with the other SS block, this implies that these CSI-RS-A and CSI-RS-B sets are QCLed with each other.

Methods of Association/Relationship Configuration Between CSI-RS Resource (Set) And SS Resource (Set)

In some embodiments, QCL grouping can be performed on an antenna port-by-port basis, or resource by resource basis. In this configuration, a resource set is QCL'ed with another resource set with the same number of ports/resources, i.e., it is QCL'ed port-by-port or resource-by-resource, respectively. In alternative embodiments, a first resource set can be QCL'ed with a second resource set having a different number of resources. In other words, M port/resources can be QCLed with N ports/resources, where M and N are each positive integers that may or may not be equal to each other.

Figure 4:
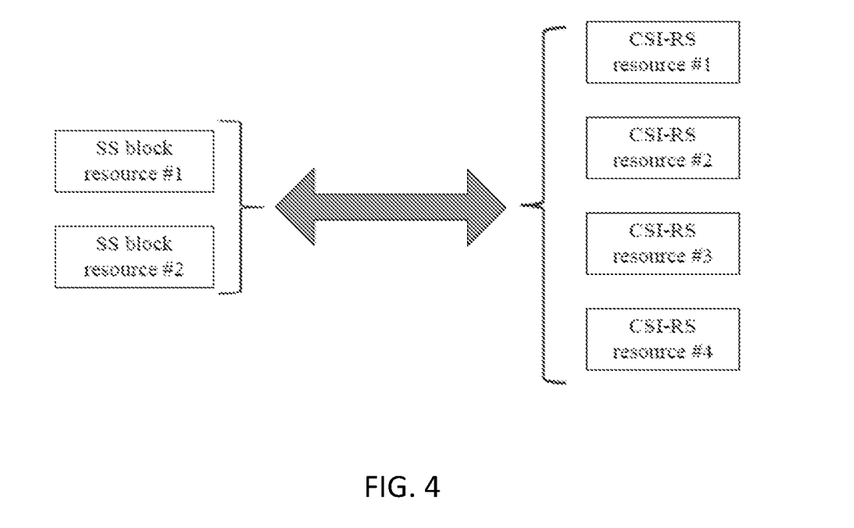
FIG. 4 illustrates a conceptual block diagram of a first resource set consisting of two SS block resources being QCLed with a second resource set consisting of four CSI-RS resources, in accordance with some embodiments.

FIG. 4 illustrates an example in which a first resource set consisting of two SS block resources #1 and #2 are QCLed with a second resource set consisting of four CSI-RS resources #1-#4. In some embodiments, such a QCL association implies that all the involved resources share the same or similar channel, transmission and/or receive properties, as discussed above. In alternative embodiments, a subset of the resources in the first resource set may be QCLed with a respective subset of resources in the second resource set. In some embodiments, the association between subsets of resources may be specified by a bit map. In alternative embodiments, a first resource set includes SS block resources 1 to $K_1$, and CSI-RS resources 1 to $X_1$, where $X_1$ is an integer multiple of $K_1$ (i.e., $X_1 = M \times K_1$, where M, $K_1$ and $X_1$ are positive integers). Each SS block resource is QCLed with M CSI-RS resources in sequential order. For example, SS block resource #1 is QCLed with CSI-RS resources #1 to #M, SS block resource #2 is QCLed with CSI-RS resources #M+1 to #2M, and so on, and SS block resource # $K_1$ is QCLed with CSI-RS resources #M×($K_1$-

1)+1 to #M×$K_1$. In some embodiments, the value of $K_1$ is determined by the BS 102 and then indicated (e.g., transmitted) to the UE 104.

Figure 5A:
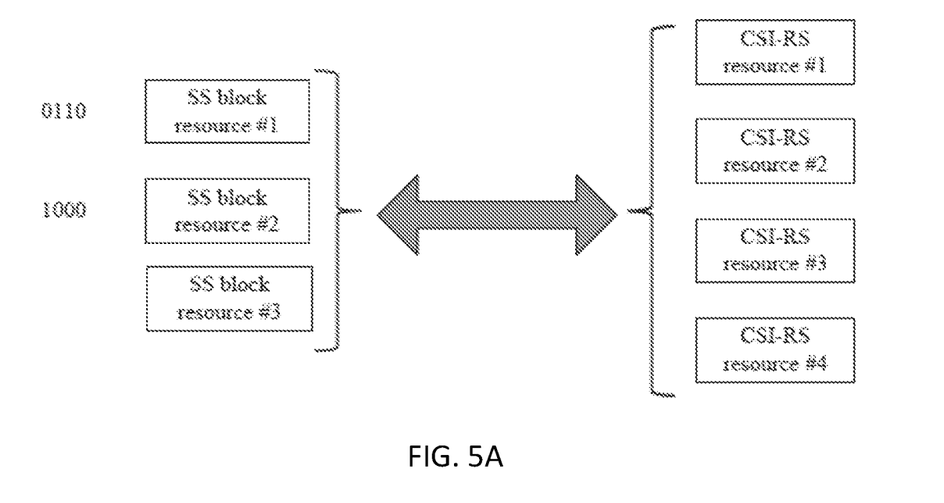
FIGS. 5A and 5B illustrate conceptual block diagrams of an exemplary Bitmap-based association between a first resource set and a second resource set, in accordance with some embodiments.
Figure 5B:
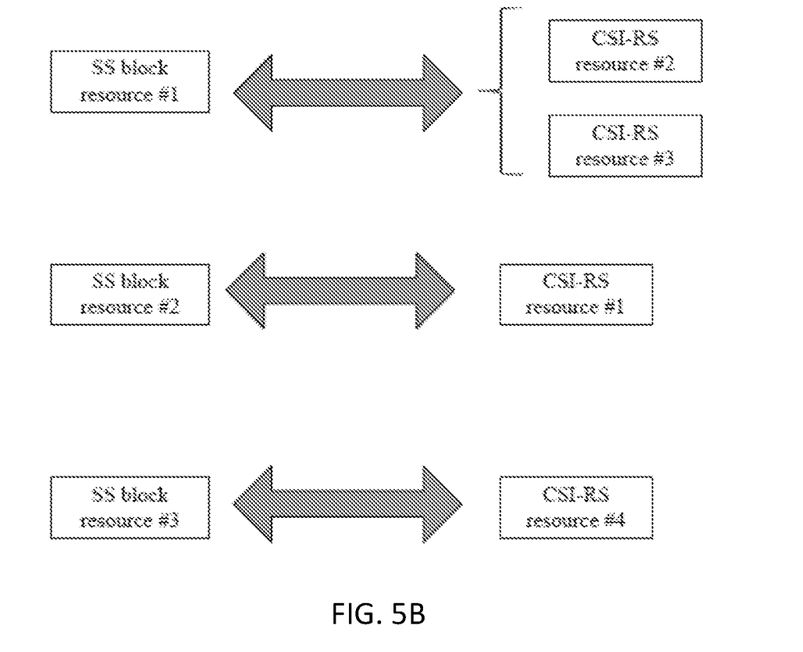

FIG. 5A illustrates an exemplary Bitmap-based association, in accordance with one embodiment of the invention. As shown in FIG. 5A, a first resource set comprises three SS block resources #1-#3, while a second resource set comprises four CSI-RS resources #1-#4. A four-bit bitmap can specify which of the resources in the second resource set is QCLed with each of the resources in the first resource set, where a value of "1" indicates an association and a value of "0" indicates no association. In the example of FIG. 5A, a bitmap of 0110 associated with SS block resource #1 indicates that it is associated with CSI-RS resources #2 and #3. Similarly, a bitmap of 1000 associated with SS block #2 indicates it is associated with CSI-RS resource #1. No bit map is necessary for the last resource block, SS block #3, in the first resource sent since it is assumed it is associated with any remaining resource(s) (i.e., CSI-RS resource #4) in the second resource set not associated with SS blocks #1 and #2. This association of respective subsets of the first and second resource sets is shown in FIG. 5B.

Hybrid SS and CSI-RS Based Beam Management

Figure 6:
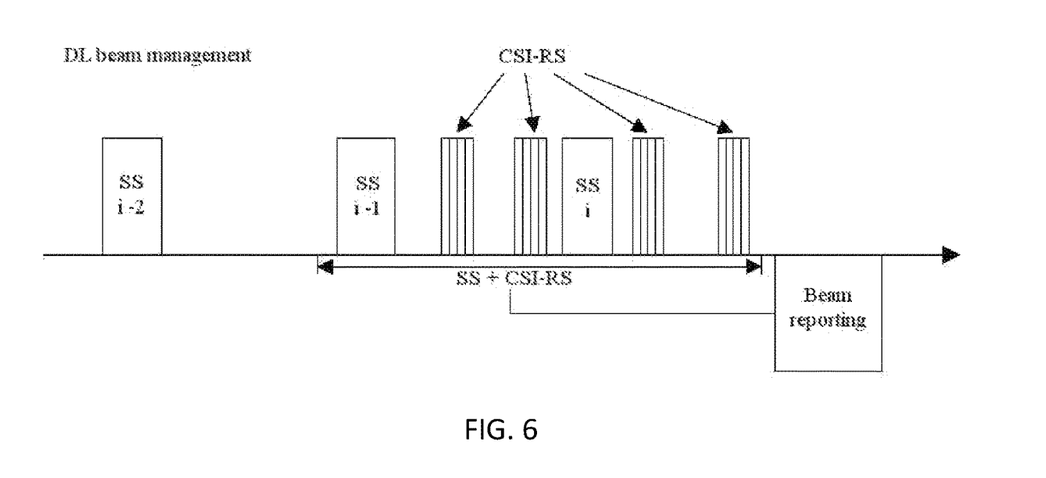
FIG. 6 illustrates a signal diagram wherein information about four CSI-RS resources and two SS block resources are transmitted during one beam reporting window, in accordance with some embodiments.

In some embodiments, CSI-RS and SS blocks are both configured/associated with one beam report (i.e., information about CSI-RS and SS block resources are sent in one reporting window or period). In contrast to channel state information (CSI) acquisition, beam reporting allows resource and/or resource+port selection in accordance with one or more pre-specified rules, such as maximizing RSRP, and/or one or more priority rules, such as the SS block can be reported only if no CSI-RS's channel properties meet the condition (e.g., none provide a max RSRP). In some embodiments, information about different RSs can be reported or indicated (e.g., CRI-RS Resource Indicator (CRI), SS block ID, etc.) within the same reporting format. For example, FIG. 6 illustrates a signal diagram wherein information about four CSI-RS resources and two SS block resources are transmitted by the UE 104 to the BS 102 during one beam reporting window.

Figure 7:
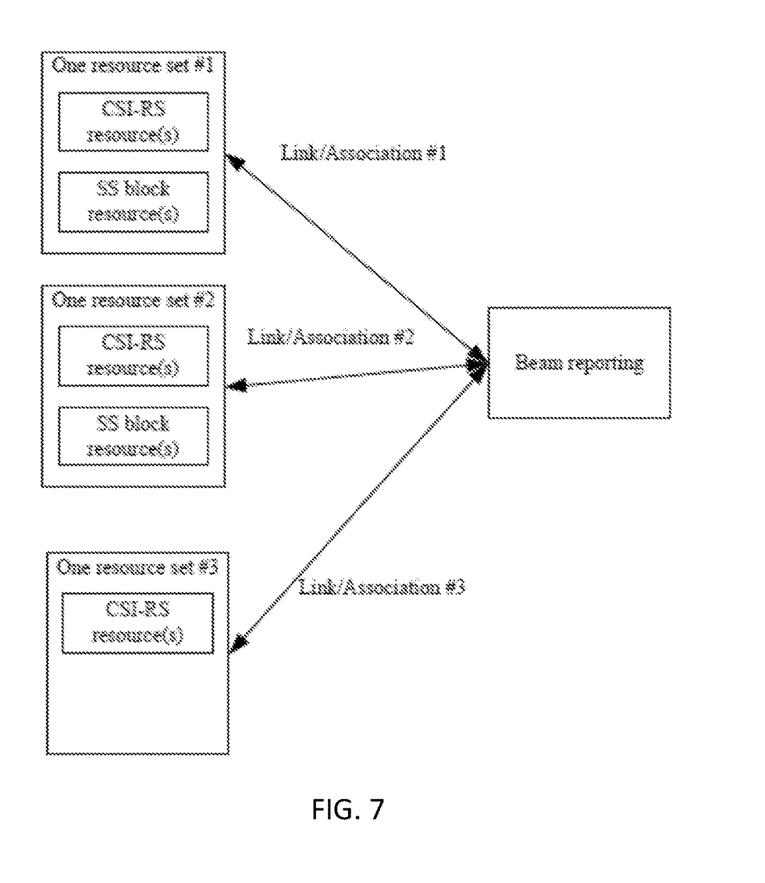
FIG. 7 illustrates a block diagram of first, second and third resource sets, which are reported in one beam reporting window, in accordance with some embodiments.

In some embodiments, a resource set can contain two or more different types of resources (e.g., CSI-RS resources and SS block resources). FIG. 7 illustrates a block diagram of first, second and third resource sets, which are reported in one beam reporting window. The first resource set includes SS block resources 1 to $K_1$, and CSI-RS resources 1 to $X_1$, where $K_1$ and $X_1$ are positive integers. The second resource set includes SS block resources 1 to $K_2$, and CSI-RS resources 1 to $X_2$, where $K_2$ and $X_2$ are positive integers. The third resource set includes only one type of resources, e.g., CSI-RS resources 1 to $X_3$, where $X_3$ is a positive integer. In accordance with various embodiments, the integers $K_1$, $X_1$, $K_2$, $X_2$ and $X_3$ may or may not be equal to one another. Thus, within each of the first and second resource sets, two different types of RS are contained, and a new resource ID can be assigned to each resource set containing the different types of RS's. In some embodiments, the new resource ED can indicate a priority of the RS's in the resource set. For example, resource ID's within a higher range of resource ID's may indicate that in the corresponding resource sets, the CSI-RS resources have a higher priority than the SS block resources in the same resource set. For example, having a higher priority means that the beams associated with the CSI-RS resources are utilized first, and the SS block beams are only utilized if none of the CSI-RS resources satisfy a predetermined criterion (e.g., a threshold RSRP value).

As shown in FIG. 7, three resource sets, each containing one or more types of resource, can be associated with three respective links (i.e., common resources used for transmission) and one beam report that is sent to the UE. It is understood that in accordance with various embodiments, the principles of the present disclosure can be applied to associate L links with N resource sets with M beam reports, where L, N and M are positive integers greater than 0, which may or may not be equal to one another.

Figure 8:
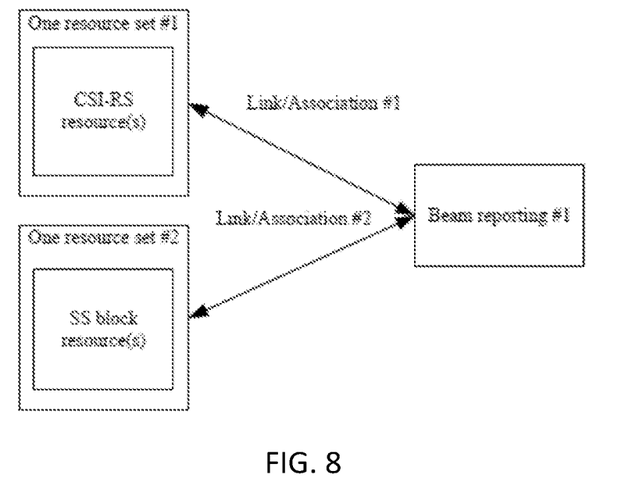
FIG. 8 illustrates a first resource set containing only CSI-RS resources and a second resource set containing only SS block resources, each associated with respective links, which are associated with one beam report, in accordance with some embodiments.

In some embodiments, a plurality of resource sets can be associated with one report setting as defined by the BS 102, where each resource set includes only one type of RS. In some embodiments, the report setting defined by the BS 102 informs the UE 104 how to create reports based on a plurality of reference signal types received by the UE, predefined rules, priorities, etc. For example, as shown in FIG. 7, a first resource set includes only SS block resources 1 to K and a second resource set includes only CSI-RS resources 1 to X, wherein K and X are positive integers greater than 0 which may or may not be equal to each other. As shown in FIG. 8, a first resource set #1 containing only CSI-RS resources and a second resource set #2 containing only SS block resources, are associated with respective links, which are associated with one beam report session. In some embodiments, a BS can configure the priority of the different RS's. For example, a UE performs beam measurements based on the received CSI-RS signals. If the RSRP associated with one or more CSI-RS is greater than a threshold, beam reporting is carried out based only on the CSI-RS measurements; otherwise, beam reporting is also performed based on SS block resources.

Figure 9:
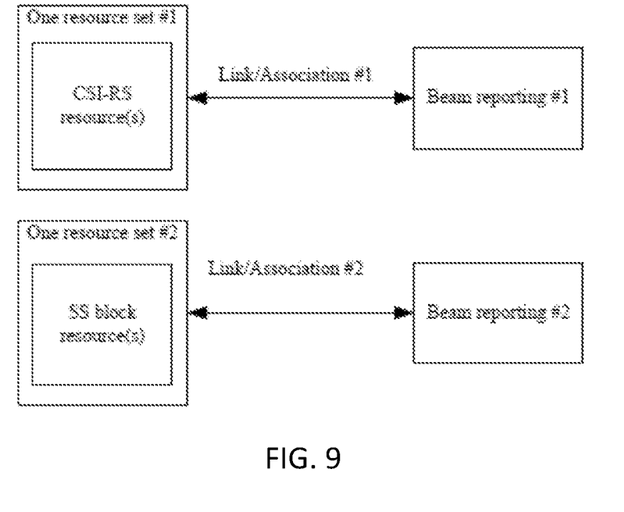
FIG. 9 illustrates a first resource set consisting of only CSI-RS resources and associated with a first link and a first beam report setting, and a second resource set consisting of only SS block resources and associated with a second link and a second beam report setting, in accordance with some embodiments.

In some embodiments, a first resource set may comprise only CSI-RS resources and be associated with a first link and a first beam report setting, while a second resource set may comprise only SS block resources and associated with a second link and a second beam report setting. This simplified scenario is shown in FIG. 9, wherein each report setting is associated with only one type of RS. In some embodiments, while the UE 104 is performing beam reporting, beam related feedback information (e.g., resource indicator, port indicator and RSRP) can be grouped based on type of RSs, as shown in Tables 1-2 below. In some embodiments, within one reported group, only one beam's information is reported as its absolute value, and the corresponding values of other beams as reported as relative values, relative to the absolute value.

TABLE 1

| One beam group | RSRP |
|---|---|
| CRI-i1 | Absolute value, e.g., −75 dBm |
| CRI-i2 | Relative value, e.g., −3 dB |
| CRI-i3 | Relative value, e.g., −4 dB |

TABLE 2

| | | |
|---|---|---|
| CSI-RS | CRI-i1 | Absolute value, e.g, −75 dBm |
| | CRI-i2 | Relative value, e.g., −3 dB |
| | CRI-i3 | Relative value, e.g., −4 dB |
| SS | Indicator information-1 on SS | Absolute value, e.g, −65 dBm |
| | Indicator information-2 on SS | Relative value, e.g., −3 dB |
| | Indicator information-3 on SS | Relative value, e.g., −4 dB |

In some embodiments, the differences in received power of the different types of RS's received by a UE is reported by the UE. Additionally, the UE can determine both the received RSRP and transmission power for each type of RS for beam reporting. This information can be configured within a RS resource setting, pre-defined or independently by system information, shown in Table 3 below.

TABLE 3

| Type of RS | Information |
| --- | --- |
| CSI-RS | Transmission power #1, e.g., 35 dBm |
| SS | Transmission power #1, e.g., 45 dBm |
| ... | ... |

In some embodiments, different thresholds are predefined for different RS types. For example, in some embodiments, only RS resources whose RSRP values are more than a predefined threshold are reported, while other RS resources are not reported. In some embodiments, different thresholds set for different RS types are defined and stored by the BS.

Hybrid Beam Reporting During Beam Recovery

Figure 10:
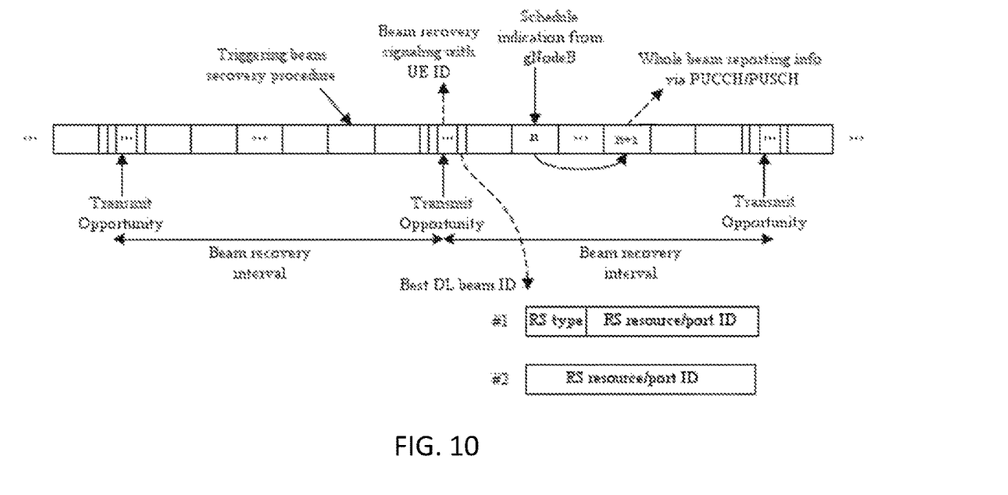
FIG. 10 illustrates a signal diagram wherein periodic CSI-RS and SS block signals are both used to generate beam reports transmitted via a physical uplink control channel (PUCCH) resource, in accordance with some embodiments.

In some embodiments, periodic CSI-RS and SS block resources are both configured by a BS to find new beams. For example, when the UE is synchronized with the BS for uplink (UL) transmissions, periodic CSI-RS and SS block signals can be both used to generate beam reports by the UE, which are transmitted via a physical uplink control channel (PUCCH) resource, along with a scheduling request (SR), for example, as shown in FIG. 10, which illustrates using the PUCCH for beam recovery. In this scenario, the BS configures some transmit opportunity for beam recovery signaling reporting. If the condition of beam recovery is met, the UE would like to report the newly potential DL Tx beam associated with either the SS block or CSI-RS in the transmit opportunity, which is located in the PUCCH region. There are two kinds of reporting format: (1) RS type+RS resource/port ID and (2) RS resource/port ID only. In some embodiments, a general ID based on renumbering or replacement of the CSI-RS and SS block ID's can be used in the second format. Subsequently, the UE can detect the schedule indication or confirmation signaling from BS. After receiving this signaling, i.e., time n in FIG. 10, the UE can send the beam reporting information via PUCCH, PUSCH or even MAC-CE signaling.

In some embodiments, for in-sync UL communications, the best downlink (DL) transmission (Tx) beam is reported first to establish at least one available communication link, which can be associated with either a SS block or CSI-RS resource that are QCLed with each other based on the same or similar spatial parameters.

Depending on whether a resource set has only one or two or more types of RS, there are two possible types of reporting formats. If the resource set has only one type of RS, then the reporting format includes only the resource/port ID. If the resource set has two or more types of RS's, the reporting format includes the RS type plus the resource/port ID. After a communication link is established, the UE can perform further scheduling processes to complete beam reporting, wherein information for more than one beam or even beam grouping information can be reported accordingly.

Figure 11:
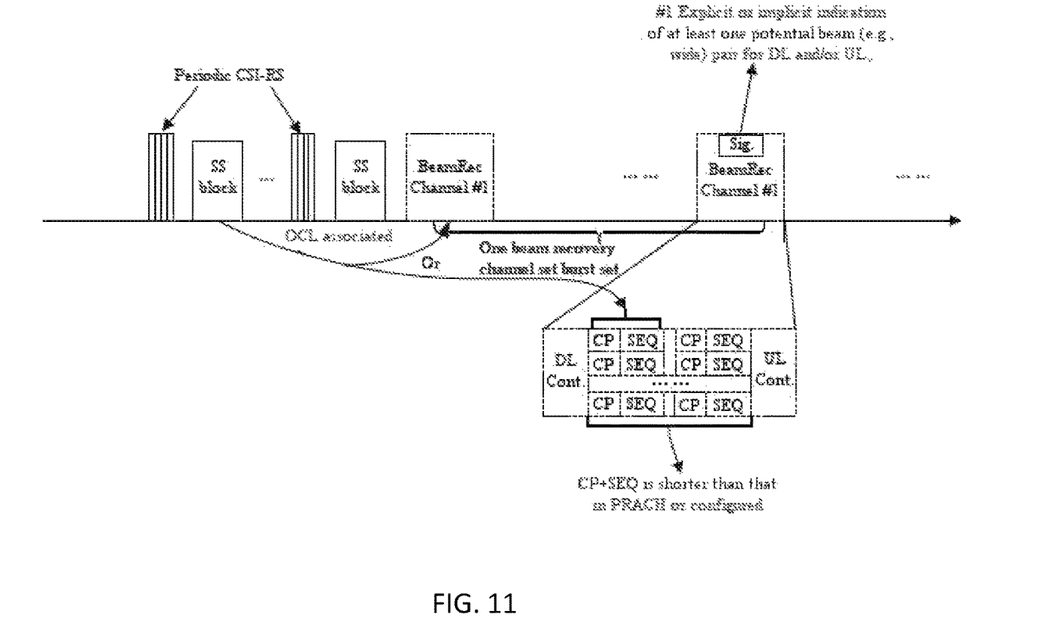
FIG. 11 illustrates a signal diagram wherein only SS block signals are used to generate beam reports transmitted via a physical random access channel (PRACH) resource, in accordance with some embodiments.

Alternatively, when the UE is not synchronized with the BS for uplink communications, only SS block signals are used to generate beam reports for reporting via a physical random access channel (PRACH) or PRACH-like channel, as shown in FIG. 11. In FIG. 11, the "BeamRec Channel" can be a PRACH or PRACH-like channel. In contrast to the scenario illustrated in FIG. 10, this channel uses the cyclic prefix (CP)+Sequence mode for beam reporting. The sequence can be associated with one virtual UE ID. The BeamRec Channel is well-suited for use when the UE is not synchronized with the BS for uplink communications and/or no UE ID is available.

In out-of-sync UL conditions as described above, the PUCCH cannot be used for beam reporting (i.e., beam recovery signaling). Although, the PRACH and PRACH-like channels are available, such channel architectures are fixed (i.e., low flexibility) and it is difficult to establish an association between the PRACH/PRACH-like channel and a UE-specific CSI-RS or configurable CSI-RS. Therefore, in accordance with some embodiments, for out-of-sync UL conditions, only SS block signals are used for beam measurement and subsequent beam reporting.

As discussed above with respect to FIGS. 10 and 11, utilizing different types of RS's, such as the CSI-RS and SS block signals described herein, can provide different methods or levels of beam recovery. Additionally, as described herein, different types of RSs can be grouped into one set or QCLed, if the different RS resources share the same or similar channel properties and/or transmission/receive properties. Additionally, QCL relationships can be inherited across different RS groups or sets. Additionally, L links can be associated with N resource groups, each containing one or more types of RS resources, which are associated with M beam reports generated by a respective UE. Therefore, different types of RS's can be measured and reported within the same reporting format and within one report setting (i.e., reporting window).

Additionally, a UE may define or determine different priorities for reporting different types of RS's. If the first priority RS cannot fulfill a reporting condition, such as a minimal RSRP or minimal SNR/SINR, the second priority RS can be used for reporting. In various embodiments, priority settings or rules can be predefined for different types of RS's, and also for portions of RSs. For example, in some embodiments, a first subset or portion of a RS can have a higher priority over a second subset or portion of the RS.

In various embodiments, multiple types of RS's can be reported, and information related to the same types of RS's can be grouped. A group ID can be used to represent the type of RS and indicators/IDs for different RS can be orchestrated independently. A UE can measure the transmission power or power difference between different types of RS's received from a TRP, and set different thresholds for reporting different types RS measurements, as well as setting rules for RS measurement selection or priority selection for purposes of beam reporting.

While various embodiments of the invention have been described above, it should be understood that they have been presented by way of example only, and not by way of limitation. Likewise, the various diagrams may depict an example architectural or configuration, which are provided to enable persons of ordinary skill in the art to understand exemplary features and functions of the invention. Such persons would understand, however, that the invention is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques.

To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, module, etc. can be configured to perform one or more of the functions described herein. The term "configured to" or "configured for" as used herein with respect to a specified operation or function refers to a processor, device, component, circuit, structure, machine, module, etc. that is physically constructed, programmed and/or arranged to perform the specified operation or function.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method, comprising:
    transmitting a first reference signal to a wireless communication node using a first resource;
    transmitting a second reference signal to the wireless communication node using a second resource, wherein the first and second reference signals are quasi co-located (QCLed),
        the first reference signal comprises a channel state information reference signal, and
        the second reference signal comprises a synchronization signal block; and
    receiving a report from the wireless communication node, wherein the report comprises information about both the first resource and the second resource, and wherein the first resource and the second resource are QCLed and are associated with a same communication link.

2. The method of claim 1, further comprising:
grouping the first resource and the second resource to form a first resource group to be allocated to a wireless communication node.

3. The method of claim 1, wherein:
the first resource comprises a first plurality of resource blocks; and
the second resource comprises a second plurality of resource blocks.

4. The method of claim 3, wherein:
a transmission property associated with the first plurality of resource blocks is different from a transmission property associated with the second plurality of resource blocks.

5. The method of claim 1, wherein:
a first set of N resources are allocated to the first reference signal;
a second set of M resources are allocated to the second reference signal, wherein N=MK, and N, M and K are positive integers; and
one resource of the second set and respective K resources of the first set in order are QCLed.

6. The method of claim 5, wherein the value of K is indicated to the wireless communication node.

7. A method, comprising:
receiving a first reference signal transmitted using a first resource;
receiving a second reference signal transmitted using a second resource, wherein
the first and second reference signals are quasi co-located (QCLed),
the first reference signal comprises a channel state information reference signal, and
the second reference signal comprises a synchronization signal block;
measuring a first signal quality parameter associated with the first reference signal;
generating a report based on at least the measured first signal quality parameter, wherein the report comprises information about both the first resource and the second resource, and wherein the first resource and the second resource are QCLed and are associated with a same communication link; and
transmitting the report to a communication node.

8. The method of claim 7, wherein:
the first resource comprises a first plurality of resource blocks; and
the second resource comprises a second plurality of resource blocks.

9. The method of claim 8, wherein:
a transmission property associated with the first plurality of resource blocks is different from a transmission property associated with the second plurality of resource blocks.

10. The method of claim 7, wherein:
a first set of N resources are allocated to the first reference signal;
a second set of M resources are allocated to the second reference signal, wherein N=MK, and N, M and K are positive integers; and
one resource of the second set and respective K resources of the first set in order are QCLed.

11. The method of claim 10, further comprising receiving an indication of the value of K from the communication node.

12. A communication node, comprising:
a transmitter configured to
transmit a first reference signal to a wireless communication node using a first resource, and
transmit a second reference signal to the wireless communication node using a second resource, wherein
the first and second reference signals are quasi co-located (QCLed),
the first reference signal comprises a channel state information reference signal, and
the second reference signal comprises a synchronization signal block; and
a receiver configured to receive a report from the wireless communication node, wherein the report comprises information about both the first resource and the second resource, and wherein the first resource and the second resource are QCLed and are associated with a same communication link.

13. The communication node of claim 12, further comprising:
a memory configured to store information concerning a first resource group formed by grouping the first resource and the second resource, the first resource group being allocated to the wireless communication node.

14. The communication node of claim 13, wherein:
the transmitter is further configured to transmit a third reference signal and a fourth reference signal to the wireless communication node using a third resource and a fourth resource, respectively;
the third reference signal comprises a third reference signal type;
the fourth reference signal comprises a fourth reference signal type different from the third reference signal type;
the third and fourth reference signals are QCLed; and
the memory is further configured to store information concerning a second resource group formed by grouping the third resource and the fourth resource, the second resource group being allocated to the wireless communication node.

15. The communication node of claim 12, wherein:
the first resource comprises a first plurality of resource blocks;
the second resource comprises a second plurality of resource blocks; and
a transmission property associated with the first plurality of resource blocks is different from a transmission property associated with the second plurality of resource blocks.

16. A first communication node, comprising:
a receiver configured to:
receive a first reference signal transmitted using a first resource, and
receive a second reference signal transmitted using a second resource, wherein
the first and second reference signals are quasi co-located (QCLed),
the first reference signal comprises a channel state information reference signal, and
the second reference signal comprises a synchronization signal block;
at least one processor configured to:
determine a first signal quality parameter associated with the first reference signal, and
generate a report based on at least the measured first signal quality parameter, wherein the report comprises information about both the first resource and the second resource, and wherein the first resource and the second resource are QCLed and are associated with a same communication link; and a transmitter configured to transmit the report to a second communication node.

17. The first communication node of claim 16, wherein:

the first and second resources are QCLed and grouped to form a first resource group associated with a same communication link;

the first resource comprises a first plurality of resource blocks;

the second resource comprises a second plurality of resource blocks; and a transmission property associated with the first plurality of resource blocks is different from a transmission property associated with the second plurality of resource blocks.

\* \* \* \* \*